Feb. 13, 1945.    J. W. HOWLETT    2,369,461
DUPLEX MACHINE FOR SIMULTANEOUSLY MACHINING TWO MEMBERS
Filed Oct. 7, 1943    5 Sheets-Sheet 2

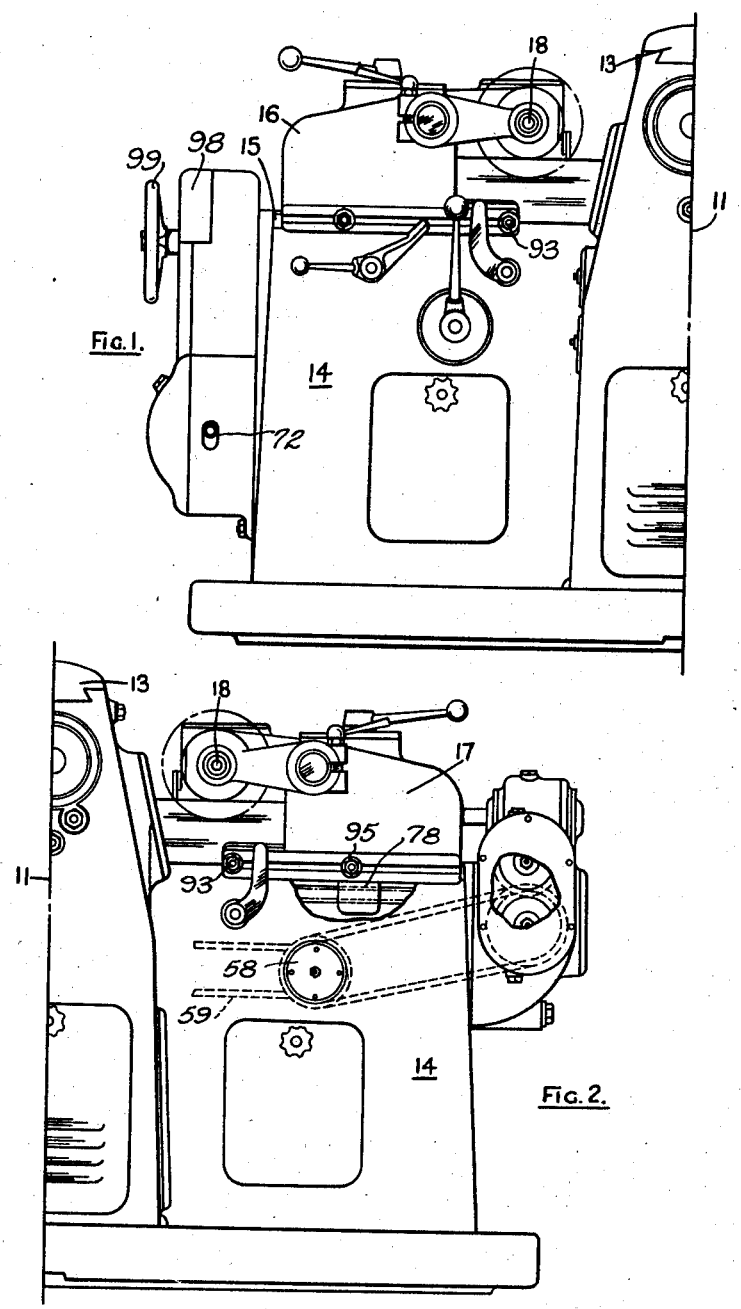

INVENTOR:
JOHN W. HOWLETT
BY Machinery Machinery
ATTYS.

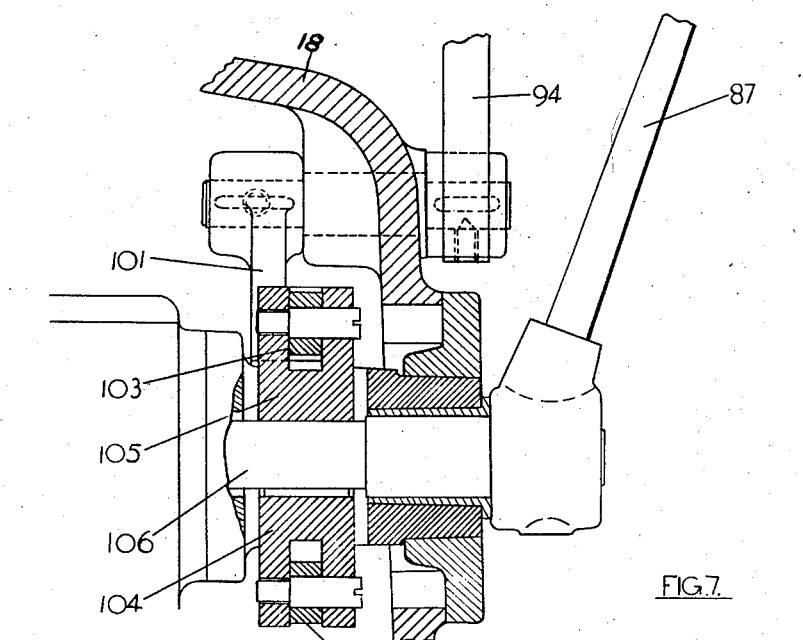
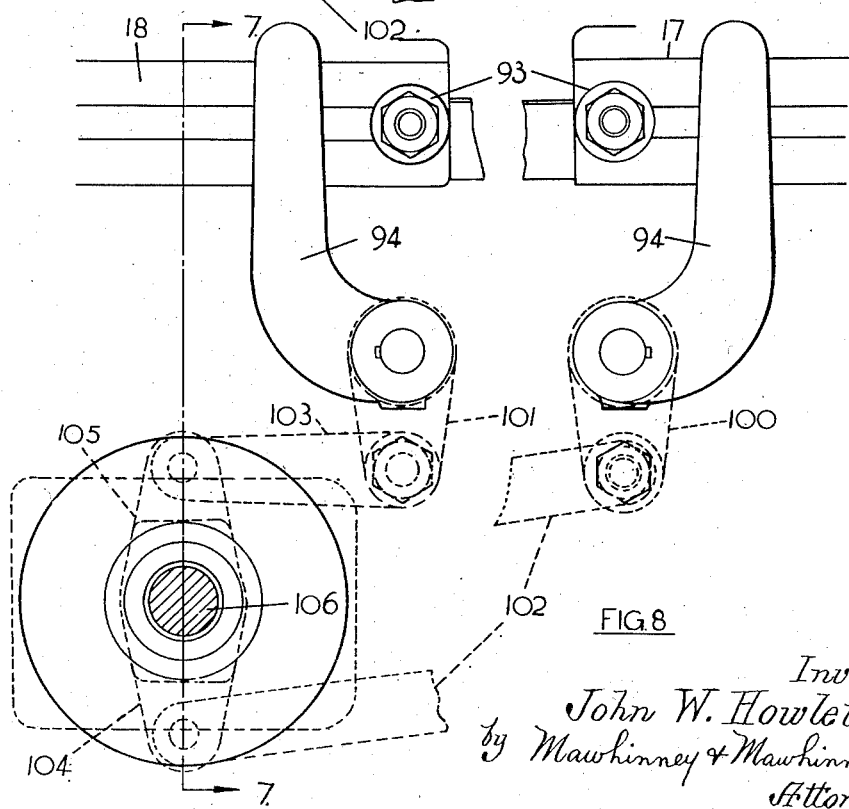

Patented Feb. 13, 1945

2,369,461

UNITED STATES PATENT OFFICE 2,369,461

DUPLEX MACHINE FOR SIMULTANEOUSLY MACHINING TWO MEMBERS

John William Howlett, London, England, assignor of one-half to Wellworthy Piston Rings Limited, London, England Application October 7, 1943, Serial No. 505,369
In Great Britain December 22, 1942

4 Claims. (Cl. 29—70)

This invention relates to a duplex machine for simultaneously machining two members, of the kind incorporating a rotatable spindle carrying a tool, and, parallel thereto, and on opposite sides thereof, spindles for supporting the members, the spindles being carried by slides, respectively, which can be fed towards the tool-carrying spindle.

As applied to a machine of this kind for forming piston-rings, washers, or other rings by cutting through metal pots, cylinders, or other tubular members in planes at right angles to their axes, both tubular members have been of the same size and it has not been possible to form different-sized rings by cutting up different-sized tubular members at the same time.

My main object is to provide means whereby this will be possible.

This and other objects and advantages of the invention will be better understood if attention be paid to the following description in which reference is made to the accompanying drawings, wherein—

Figure 1 is a front elevation of the left half of the machine having means for driving the lead screw according to the invention, and Figure 2 is a front elevation of the right half of the machine, the vertical centre line thereof being marked 11 in the two figures;

Figure 5:
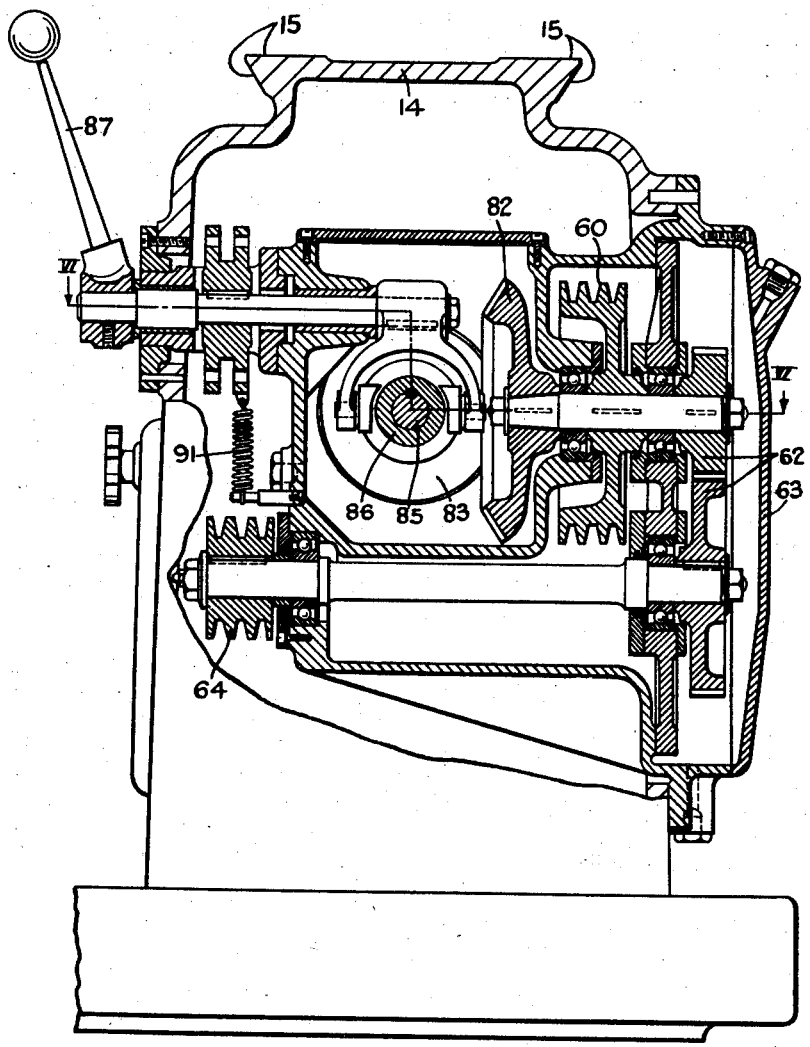
Figure 5 is a cross-section taken on the lines V—V of Figures 4 and 6.

Figure 7 is a sectional elevation corresponding to Figure 5, but to a larger scale, of the control handle 87 and associated points, the section being taken on the line VII—VII of Figure 8; and Figure 8 is a fragmentary elevation corresponding to Figures 1 and 2, but to the larger scale, showing the interconnection of the arms 94 in those two figures with the shaft of the control handle 87.

According to the invention, the slides can be fed by individual lead screws which are connected to be driven in unison, whilst manual means is provided for adjusting one of the lead screws relatively to the other, whereby the machine can be used for simultaneously machining different-sized members. Preferably, the machine incorporates also manually-controlled quick-traverse means acting on the lead screws.

According to a further feature of the invention, provision is made for automatically disconnecting the drive to the lead screws dependently upon the position of either slide with respect to the tool-carrying spindle, so that the quick-traverse will be discontinued when either of the slides reaches an extreme position. Conveniently, the feed drive and the quick-traverse drive are both to a gear on one of the lead screws which are detachably connected to one another to revolve in unison, the manual means acting on the other of the lead screws.

Figure 3:
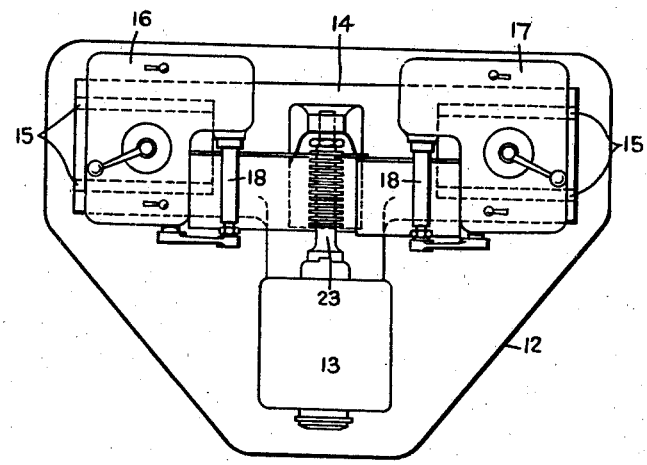
Figure 3 is a plan view of the machine to a smaller scale.

Referring now to the drawings, the machine itself, it will be observed from Figure 3, is in substance shaped like a squat T, excepting for the base plate 12, the machine comprising a headstock 13 in front of a main body 14 which terminates at a lower level than the top of the headstock and is machined to provide aligned ways 15 in a horizontal plane for two slides 16 and 17. The slides are substantially similar, each supporting a spindle 18 adapted to carry one of the tubular members to be cut through. The cutter-carrying spindle 23 is driven from the headstock.

The driving means for these three spindles is preferably as disclosed in the specification accompanying my copending patent application Serial No. 505,366, filed the 7th of October, 1943, and the spindles 18 may be supported as disclosed in the specification accompanying my copending patent application Serial No. 505,367, filed the 7th of October, 1943.

Figure 6:
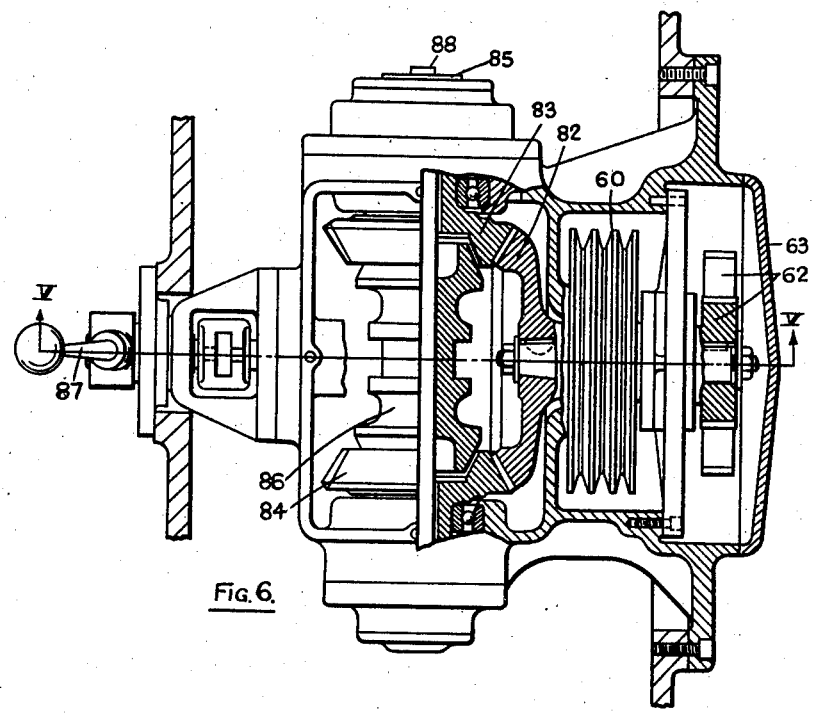
Figure 6 is a sectional plan taken on the lines VI—VI of Figure 5.
Figure 4:
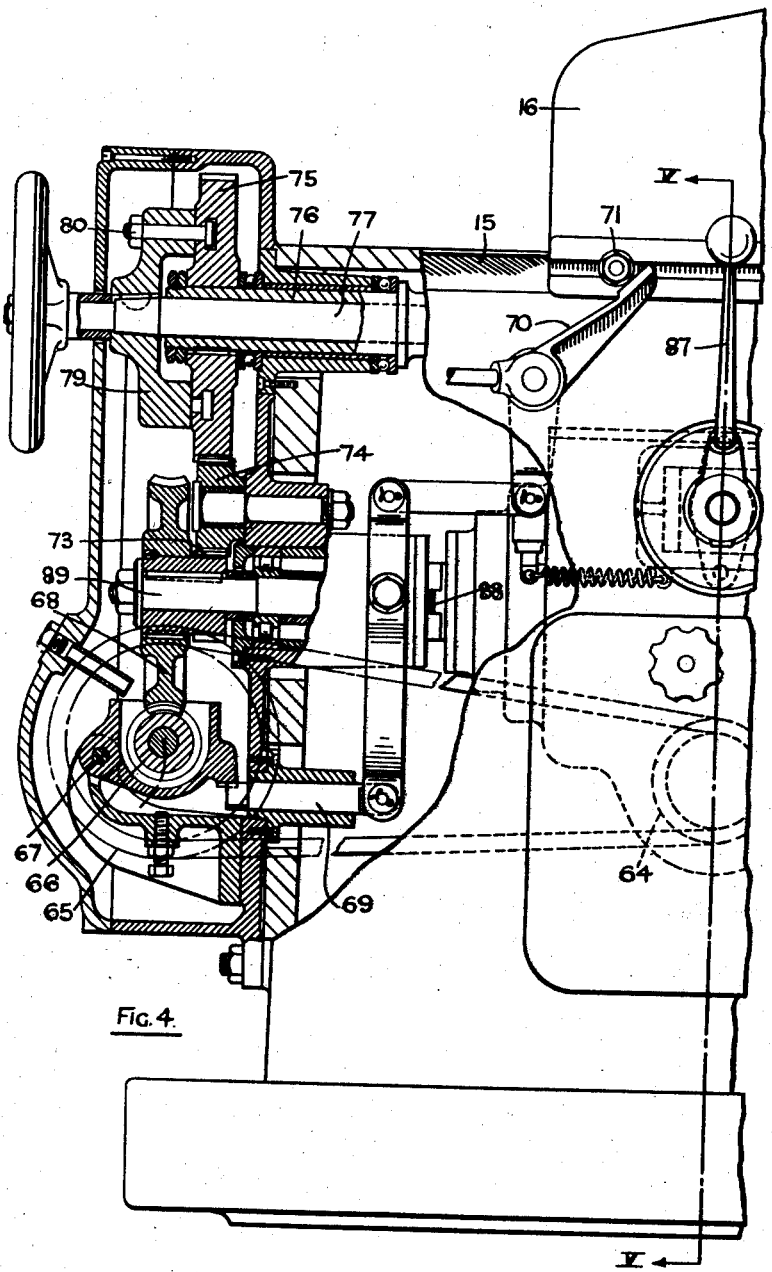
Figure 4 is a front sectional elevation of the left-hand end of the machine to a larger scale.

In the right-hand side (Figure 2) of the machine is disposed the driving motor, not shown, for the spindles 18, the motor driving to a pulley-shaft supported by the boss 58. The pulley shaft drives by a belt 59 across the machine to a pulley 60 (Figures 5 and 6) in the left-hand half of the machine, the pulley 60 driving through a vertically-arranged pick-off gear pair 62 (accessible upon removal of the cover 63, which is at the back of the machine) to a pulley 64, which in turn drives by belt to a pulley 65 (Figure 4) on a worm shaft 66 of a drop-out worm box pivotally mounted at 67. The worm box can be held with the worm in mesh with a worm wheel 68 by means of a catch 69 which can be released by a stop arm 70, the latter being manually operable or automatically operable in a well-understood manner when engaged by an adjustable abutment 71 on the slide 16. The worm box can be raised by means of the handle 72 (Figure 1).

Fast with the worm wheel 68 is a gear 73 which meshes through an idler 74 with a gear 75 fast on a hollow lead screw 76 for the slide 16. Extending through the hollow lead screw 76 is a lead screw 77 for the slide 17, Figure 2 showing it engaged with a nut 78 fast with the slide 17 and extending through a cored hole in the base 14. The lead screw 77 has fast on it a disc 79 which is adjustably coupled to the gear 75, the coupling means in the present instance being shown as comprising T-headed bolts 80 engaged in an undercut groove provided in the gear 75. Thus, in ordinary conditions, the two lead screws are driven in unison when the worm box is raised for automatic feeding purposes.

Referring again to Figures 5 and 6, the pulley 60 is fast with a bevel gear 82 which is permanently meshed with oppositely-disposed bevel pinions 83 and 84 free on a shaft 85 and selectively clutchable thereto by a double-acting cone-faced member 86 operable by a handle 87. The shaft 85 is formed with dogs 88 (Figures 4 and 6) which engage with corresponding dogs on a shaft 89 upon which the worm wheel 68 and gear 73 are fast. Thus, when the worm box has been lowered, operation of the handle 87 in one or the other direction introduces a quick-traverse movement of the slides 16, 17 through the lead screws.

The handle 87 is conveniently biased to a neutral position as by means of a spring 91 so that it must be held in an engaged position when the quick-traverse drive is required. The double-acting clutching member 86 is preferably designed so that it can slip if the handle 87 should be moved in an engaging direction while the worm box is raised.

In order to prevent the slides when being returned by the quick-traverse drive from overrunning the ends of the ways, we provide each of them with an adjustable abutment 93, the latter coacting in a known manner with arms 94 on the right and left-hand sides of the machine and interconnected with one another and with the handle 87 such as to ensure the return of the latter to the neutral position when a quick traverse in the return direction has been effected. In like manner further abutments may be provided on the slides to coact with the arms 94 and ensure a disconnection of the quick-traverse drive in the forward direction before the tubular members are brought into engagement with the cutters. One such abutment is indicated at 95 in Figure 2.

The duplex machine described is adapted for machining tubular members of different diameters, so that two different jobs of work can be attended to on the one machine when this should be necessary. For this purpose the relative positions of the slides 16, 17 with respect of the cutters must be adjustable, and to enable this to be done a cover plate 98 (Figure 4) is first removed and the T-headed bolts 80 are then released. Thereupon the lead screw 77, for the slide 17, can be turned by a hand wheel 99 in order to adjust this slide so that the periphery of the tubular member to be mounted on its spindle 18 will be spaced from the cutters a distance equal to that at which the periphery of the tubular member to be mounted on the spindle 18 for the slide 16 will be spaced. Thereupon the bolts 80 are tightened again to interconnect the two lead screws for movement in unison and the cover plate 98 can be replaced.

It will be appreciated that the slide 17 when being adjusted in this way will be brought nearer to the spindle 23 or spaced further from it dependently upon the size of the tubular member to be mounted on its spindle, and it is necessary to make sure that the quick-traverse motion will cease when whichever of the slides 16, 17 first completes its return movement, to obviate it overrunning the ways 15 and causing damage. It is for this reason that we provide each slide with an adjustable abutment 93 coacting with arms 94, the two arms being interconnected with one another and with the handle 87 as described above.

Referring now to Figures 7 and 8, the two arms 94 are each in the form of bell crank levers, the other arms 100, 101 of which are connected by links 102, 103, respectively, to lower and upper arms 104, 105 fast on the shaft 106 upon which the control handle 87 is mounted, so that they will be operated in unison when the control handle is operated; and when either arm 94 is operatively engaged by the associated abutment 93 the control handle 87 will be returned to its neutral position. The spring 91 of Figure 5 is omitted from Figure 7.

What I claim as my invention and desire to secure by Letters Patent of the United States is:

1. A duplex machine for simultaneously machining two members, including a rotatable tool-carrying spindle, and parallel thereto and on opposite sides thereof spindles for supporting the members, the last-mentioned spindles being carried by slides, respectively, individual lead screws, connected to be driven in unison for feeding said slides, and manual means for adjusting one of said lead screws relatively to the other whereby the machine can be used for simultaneously machining different-sized members.

2. A duplex machine for simultaneously machining two members, including a rotatable tool-carrying spindle, and parallel thereto and on opposite sides thereof spindles for supporting the members, the last-mentioned spindles being carried by slides, respectively, individual lead screws, connected to be driven in unison for feeding said slides, manual means for adjusting one of said lead screws relatively to the other whereby the machine can be used for simultaneously machining different-sized members, and manually-controlled quick-traverse means acting on said lead screws.

3. A duplex machine for simultaneously machining two members, including a rotatable tool-carrying spindle, and parallel thereto and on opposite sides thereof spindles for supporting the members, the last-mentioned spindles being carried by slides, respectively, individual lead screws, connected to be driven in unison for feeding said slides, manual means for adjusting one of said lead screws relatively to the other whereby the machine can be used for simultaneously machining different-sized members, manually-controlled quick-traverse means acting on said lead screws, and means operable by either of said slides (dependently upon their relative positions with reference to the tool-carrying spindle) for disconnecting the drive to said lead screws as necessary.

4. An arrangement, according to claim 3, characterized in that the feed drive and the quick-traverse drive are both to a gear on one of said lead screws, said lead screws being detachably connected to one another to revolve in unison, said manual means acting on the other of said lead screws.

JOHN WILLIAM HOWLETT.